(12) United States Patent
Alkire, III

(10) Patent No.: US 8,040,668 B1
(45) Date of Patent: Oct. 18, 2011

(54) RECORD AND PLAY MEDICINE BRACELET

(76) Inventor: Don M. Alkire, III, Blythewood, SC (US)

( * ) Notice: Subject to any disclaimer, the term of this patent is extended or adjusted under 35 U.S.C. 154(b) by 518 days.

(21) Appl. No.: 12/332,683

(22) Filed: Dec. 11, 2008

(51) Int. Cl.
*G06F 1/16* (2006.01)

(52) U.S. Cl. ............. 361/679.03; 340/572.8; 340/572.9; 340/573.1; 368/10

(58) Field of Classification Search ............. 361/679.03
See application file for complete search history.

(56) References Cited

U.S. PATENT DOCUMENTS

| | | | |
|---|---|---|---|
| 3,800,450 A | 4/1974 | Laugherty et al. | |
| 3,805,427 A | 4/1974 | Epstein | |
| 4,078,660 A | 3/1978 | Lerro | |
| 5,337,290 A * | 8/1994 | Ventimiglia et al. | 368/10 |
| 5,877,742 A * | 3/1999 | Klink | 345/685 |
| 5,883,576 A * | 3/1999 | De La Huerga | 340/573.1 |
| D415,058 S | 10/1999 | Haase | |
| 5,986,562 A * | 11/1999 | Nikolich | 340/693.5 |
| 6,216,490 B1 | 4/2001 | Radley-Smith | |
| 6,419,158 B2 * | 7/2002 | Hooglander | 235/492 |
| 6,747,561 B1 * | 6/2004 | Reeves | 340/573.1 |
| 6,845,063 B2 * | 1/2005 | Mitchell | 368/10 |
| 6,985,870 B2 | 1/2006 | Martucci et al. | |
| 7,204,425 B2 * | 4/2007 | Mosher et al. | 235/492 |
| 7,961,108 B2 * | 6/2011 | Klein | 340/572.8 |
| 2002/0092220 A1 * | 7/2002 | Mitchell | 40/633 |
| 2002/0111830 A1 | 8/2002 | Tahan | |
| 2005/0030190 A1 * | 2/2005 | Turner | 340/691.1 |
| 2005/0237704 A1 * | 10/2005 | Ceresoli | 361/683 |
| 2006/0042139 A1 | 3/2006 | Mendes | |
| 2006/0218011 A1 | 9/2006 | Walker et al. | |
| 2007/0088224 A1 * | 4/2007 | Friedman et al. | 600/490 |
| 2008/0204237 A1 * | 8/2008 | Levin | 340/572.1 |

* cited by examiner

*Primary Examiner* — Jinhee Lee
*Assistant Examiner* — Anthony Q Edwards
(74) *Attorney, Agent, or Firm* — Kyle Fletcher

(57) ABSTRACT

The invention is a record and play medicine bracelet that includes a pre-recorded audio file that is accessed via a coded key. The record and play medicine bracelet may be adapted for a single use or multiple uses wherein the pre-recorded audio file may be recorded over. The pre-recorded audio file is accessed via the insertion of a coded key into a key input slot that is located on the bracelet. The bracelet is also capable of maintaining a log of times and persons who have accessed said information, which can be retrieved by a port located on the bracelet that can connect to a computer.

20 Claims, 2 Drawing Sheets

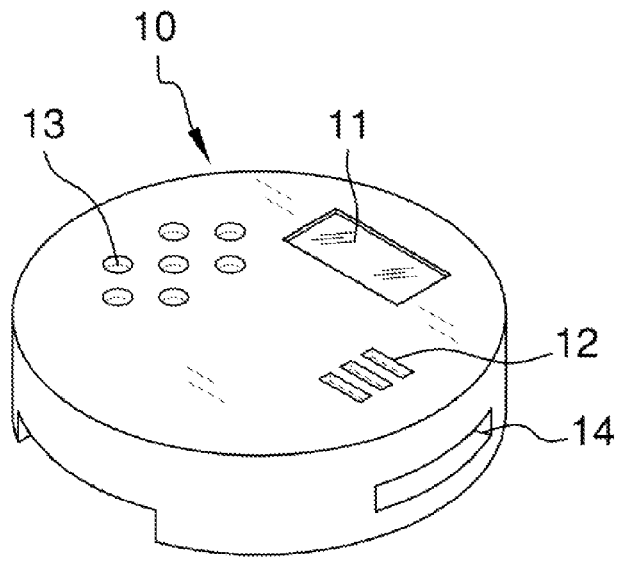
FIG. 1
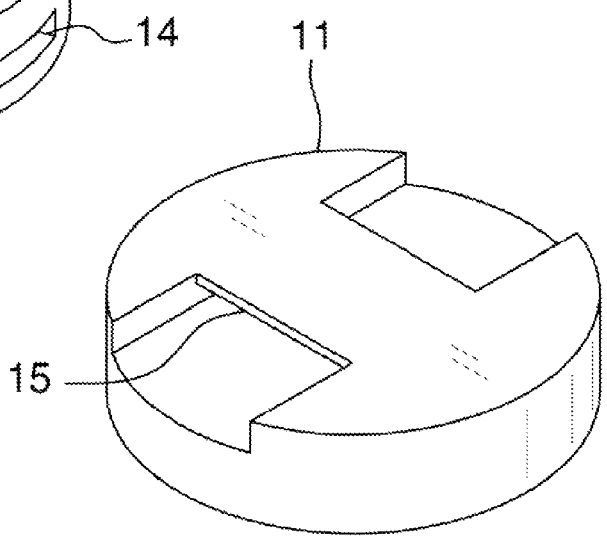
FIG. 2
FIG. 3
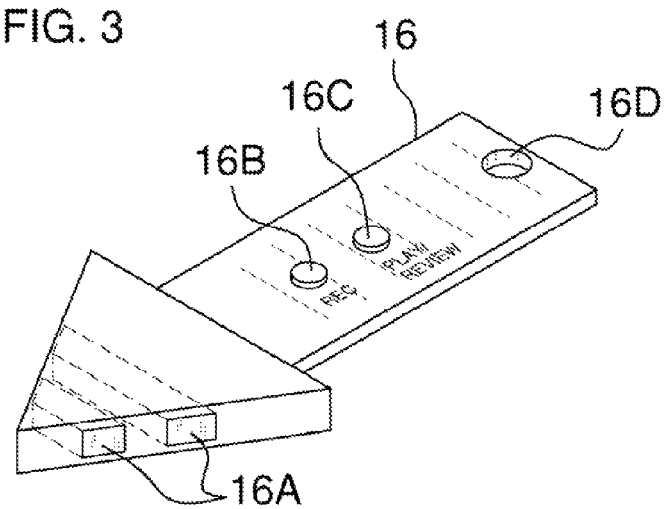

RECORD AND PLAY MEDICINE BRACELET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of medical bracelets, more specifically, a medical bracelet that upon insertion of a coded key, an audio playback of the patient's medical information is played.

B. Discussion of the Prior Art

As a preliminary note, it should be stated that there is an ample amount of prior art that deals with medical bracelets. As will be discussed immediately below, no prior art discloses a medical bracelet that uses a coded key to playback an audio recording of the patient's medical information, and of which a port is provided to plug into a computer in order to retrieve a log of accessing such information and by whom said information was accessed.

The Walker et al. Patent Application Publication (U.S. Pub. No. 2006/0218011) discloses a system and method for improved health care compliance system that includes a medical information bracelet with digital means to record and track events and in which that data may be compared to verify accuracy and identify errors, also having a speaker for playback of pre-recorded audio messages pertaining to patient compliance. However, the medical information bracelet does not have an accompanying coded key that when inserted into the bracelet will reveal the patient's information. Also, the bracelet does not keep a log of the times and persons who retrieved the stored information, and of which said log can be accessed via a port that connects to a computer.

The Martucci et al. Patent (U.S. Pat. No. 6,985,870) discloses a medication delivery system that includes a tag containing patient data, in the form of a bracelet adapted to be worn by the patient. However, the bracelet does not have an audio playback function that is accessed via a coded key that also maintains a log of persons and times from which said audio playback is accessed.

The Reeves Patent (U.S. Pat. No. 6,747,561) discloses a bracelet for digital storage and retrieval of medical records and personal identification. Again, the bracelet does not have a coded key for accessing the medical records stored in the bracelet.

The Radley-Smith (U.S. Pat. No. 6,216,490) discloses an electronic information display bracelet, to be used in hospitals to store details of a patient's identity and their relevant medicine. However, the bracelet does not include a coded key that is required to access such information. Also, the information is retrieved via a pre-recorded audio file.

The Tahan Patent Application Publication (U.S. Pub. No. 2002/0111830) discloses a device for providing and storing a patient's medical history on a wrist-worn bracelet. Again, the bracelet does not have a coded key for accessing the medical records stored in the bracelet.

The Mendes Patent Application Publication (U.S. Pub. No. 2006/0042139) discloses a medical information bracelet in which the medical information is affixed to the bracelet via a digital storage medium. However, the medical information does not require a coded key to unlock and access such information. Also, the bracelet does not involve a speaker for playback of a pre-recorded audio file detailing the patient's medical information.

The Epstein Patent (U.S. Pat. No. 3,805,427) discloses a medical alarm bracelet having specific medical information imprinted inside of the bracelet. However, the medical alarm bracelet is not capable of playing a pre-recorded audio file.

The Laugherty et al. Patent (U.S. Pat. No. 3,800,450) discloses a permanently-attached identification band, which identifies the person wearing said band. However, the band does not have a speaker and memory unit for playing back a pre-recorded audio file that contains medical information.

While the above-described devices fulfill their respective and particular objects and requirements, they do not describe a medical bracelet that plays back a pre-recorded audio file that contains medical information, and from which such information is only accessed upon insertion of a coded key; and wherein said bracelet maintains a log of times and persons who have retrieved such medical information. In this regard, the record and play medicine bracelet departs from the conventional concepts and designs of the prior art.

SUMMARY OF THE INVENTION

The invention is a record and play medicine bracelet that includes a pre-recorded audio file that is accessed via a coded key. The record and play medicine bracelet may be adapted for a single use or multiple uses wherein the pre-recorded audio file may be recorded over. The pre-recorded audio file is accessed via the insertion of a coded key into a key input slot that is located on the bracelet. The bracelet is also capable of maintaining a log of times and persons who have accessed said information, which can be retrieved by a port located on the bracelet that can connect to a computer.

An object of the invention is to provide a bracelet capable of storing medical information via an audio recording that enables the medical practitioner access to such information in order to cross-check or verify a patient's medical information in an effort to minimize the possibility of medical malpractice.

A further object of the invention is to provide a record and play medicine bracelet that allows access to the pre-recorded audio signal via a coded key that is inserted into a key slot located on the bracelet.

A further object of the invention is to provide a record and play medicine bracelet that maintains a log of the times and persons who have accessed the pre-recorded audio file via a port located on the bracelet housing, which enables connection with a computer.

These together with additional objects, features and advantages of the record and play medicine bracelet will be readily apparent to those of ordinary skill in the art upon reading the following detailed description of presently preferred, but nonetheless illustrative, embodiments of the record and play medicine bracelet when taken in conjunction with the accompanying drawings.

In this respect, before explaining the current embodiments of the record and play medicine bracelet in detail, it is to be understood that the record and play medicine bracelet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the record and play medicine bracelet. It is therefore important that the claims be regarded as including such equivalent construction insofar as they do not depart from the spirit and scope of the record and play medicine bracelet. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a top, isometric view of the bracelet housing;

FIG. 2 illustrates a bottom, isometric view of the bracelet housing;

FIG. 3 illustrates an isometric view of the coded key;

DETAILED DESCRIPTION OF THE EMBODIMENT

Figure 4:
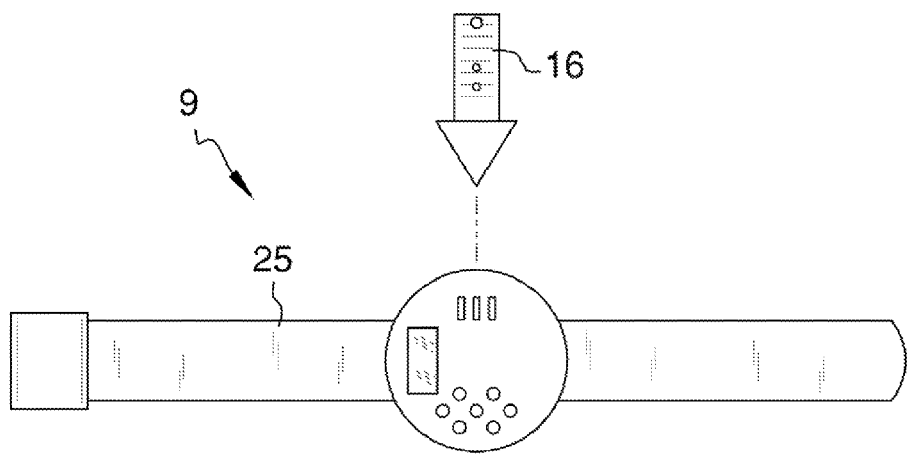
FIG. 4 illustrates a via of the bracelet housing, bracelet strap, and coded key.
Figure 5:
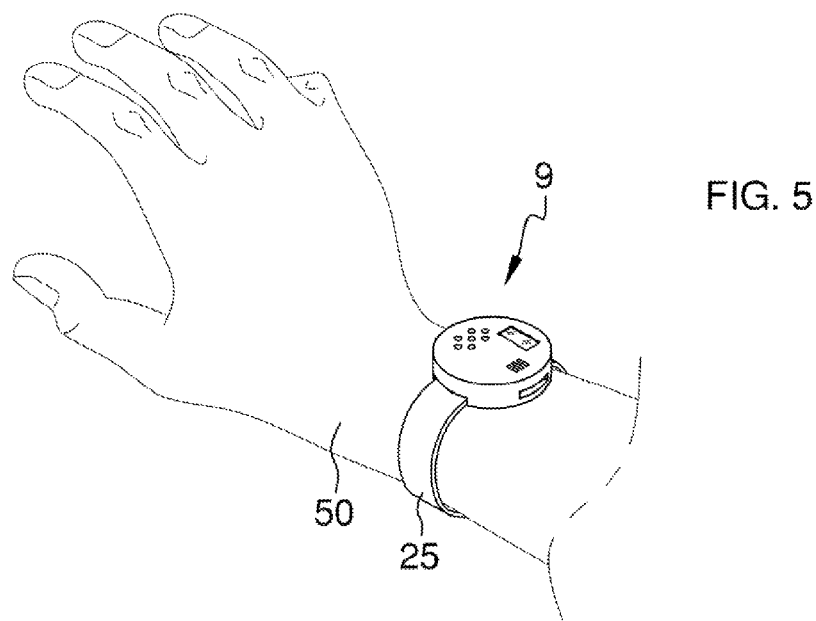
FIG. 5 illustrates a view of the invention as worn on a patient.

Detailed reference will now be made to the preferred embodiment of the present invention, examples of which are illustrated in FIGS. 1-5. A record and play medicine bracelet 9 (hereinafter invention) includes a bracelet housing 10 that includes an LCD screen 11, a microphone 12, a speaker 13, a key slot 14, a strap sleeve 15, a central processing unit (not depicted) (hereinafter CPU), at least one battery (not depicted), a coded key 16, and a computer port 17.

The strap sleeve 15 is for the support of a strap 25, which will attach on a patient's wrist 50. The strap 25 may be adapted for use as either a disposable strap or a re-usable strap. In the event the strap 25 is disposable, the invention 9 may be either designed for a single application or re-useable.

The invention 9, as depicted, includes the microphone 12, which enables a pre-recorded audio message to be recorded and later played via the speaker 13. The LCD screen 11, the microphone 12, and the speaker 13 are connected to the CPU (not depicted), which is located within the housing 10.

The LCD screen 11 enables an end user to view the number of entries that are stored on the CPU (not depicted), and to see the particular entry being recorded or played.

The CPU (not depicted) is also connected to the key slot 14, which is capable of reading the coded key 16. The coded key 16 has a metal connector 16A that is scanned via the key slot 15, which in turn transmits a code from the coded key 16, whether correct or not, to the CPU (not depicted). Once the CPU (not depicted) receives a code from the key slot 15, which matches the code that is pre-programmed onto the CPU (not depicted); the CPU (not depicted) can be ordered to play an existing entry via the speaker 13 or record a new entry via the microphone 12. Also, once the CPU not depicted) receives the correct code from the key slot 15, the LCD display 11 will illuminate and shown the number of available entries, the current entry being played, or the amount of recording time that has elapsed with a new entry.

The coded key 16 also has a record button 16B, a play/review button 16C, and a ring opening 16D. Once the coded key 16 is inserted into the key slot 15, the medical personnel can elect to either record a new entry, or play a prior entry. Only the medical personnel can record information or play entries from the housing, which prevents unwanted entries or unwanted access by unprivileged persons.

The coded key 16 can be placed about a bracelet, necklace, keychain, or other tether-based item that the medical personnel so chooses.

The CPU (not depicted) relies on a battery or plurality of batteries (not depicted) to record, read the coded key 16, or operate the speaker 13. However, it shall be noted that other powering means may be utilized by the CPU (not depicted), and comprise an array of solar cells, or an electrical wiring that connects to an auxiliary electrical source.

The CPU (not depicted) is connected to the computer port 17, which enables access of the invention 9 to a computer (not shown). The CPU (not depicted) maintains a log of the times and coded keys 16 that have accessed the pre-recorded audio file stored on the CPU (not depicted). The ability of the CPU (not depicted) to maintain said log may imply that either a single coded key 16 or multiple coded keys 16 may have the correct code stored thereon, which enables either a single person or multiple people access to the pre-recorded audio file contained on the CPU (not depicted). Should multiple coded keys 16 have access to the pre-recorded audio file contained in the CPU (not depicted), then the CPU (not depicted) may be capable of denoting the different coded keys 16 having access via the log.

It shall be noted that the ability of the invention 9 to maintain a log, and access such log via a computer is an option of the invention 9 and not a requirement of the function of the invention 9. In other words, the invention 9 can function without the inclusion of the computer port 17.

With respect to the above description, it is to be realized that the optimum dimensional relationship for the various components of the invention 9, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 9.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A record and play medicine unit comprising:
   (a) a housing;
      wherein the housing includes a central processing unit (hereinafter CPU), and wherein the CPU stores recorded audio entries;
      wherein the housing includes a speaker, and wherein the speaker is wired to the CPU;
      wherein the housing includes a key slot, and wherein the key slot is wired to the CPU;
      wherein the housing includes a strap sleeve;

(b) a strap;
  wherein the strap attaches to the housing via the strap sleeve;
(c) a coded key;
  wherein the coded key contains a code that can be read via the key slot;
  wherein the coded key has a record button and a play button;
  wherein the key slot relays the code from the coded key to the CPU, which will play an existing audio entry or record a new audio entry via depression of the corresponding button.

2. The record and play medicine unit as described in claim 1 wherein a bracelet attaches to the housing, and wherein the bracelet is either disposable or reusable.

3. The record and play medicine unit as described in claim 1 wherein the record and play medicine unit is either disposable or reusable.

4. The record and play medicine unit as described in claim 1 wherein the CPU is powered by a powering means comprising a single battery, a plurality of batteries, an array of solar cells, or an electrical wire that connects to an auxiliary electrical source.

5. The record and play medicine unit as described in claim 1 wherein the housing includes a microphone that is wired to the CPU; wherein the microphone enables a recorded audio entry to be recorded onto the CPU.

6. The record and play medicine unit as described in claim 5 wherein the microphone enables an audio file to be recorded over the pre-recorded audio entry.

7. The record and play medicine unit as described in claim 1 wherein the housing includes a computer port that enables the CPU to be connected to a computer in order to access a log of dates and times the pre-recorded audio entry was accessed by the coded key.

8. The record and play medicine unit as described in claim 1 wherein the housing includes a computer port that enables the CPU to be connected to a computer in order to access a log of dates and times the pre-recorded audio entry was accessed by multiple coded keys.

9. The record and play medicine unit as described in claim 6 wherein the housing includes a computer port that enables the CPU to be connected to a computer in order to access a log of dates and times the pre-recorded audio entry was accessed by the coded key.

10. The record and play medicine unit as described in claim 6 wherein the housing includes a computer port that enables the CPU to be connected to a computer in order to access a log of dates and times the pre-recorded audio entry was accessed by multiple coded keys.

11. A record and play medicine unit comprising:
(a) a housing;
  wherein the housing includes a central processing unit (hereinafter CPU), and wherein the CPU stores recorded audio entries;
  wherein the housing includes an LCD display, and wherein the LCD display can display the number of recorded audio entries located on the CPU;
  wherein the housing includes a speaker, and wherein the speaker is wired to the CPU;
  wherein the housing includes a key slot, and wherein the key slot is wired to the CPU;
  wherein the housing includes a strap sleeve;
(d) a strap;
  wherein the strap attaches to the housing via the strap sleeve;
(e) a coded key;
  wherein the coded key contains a code that can be read via the key slot;
  wherein the coded key has a record button and a play button;
  wherein the key slot relays the code from the coded key to the CPU, which will play an existing audio entry or record a new audio entry via depression of the corresponding button.

12. The record and play medicine unit as described in claim 11 wherein a bracelet attaches to the housing, and wherein the bracelet is either disposable or reusable.

13. The record and play medicine unit as described in claim 11 wherein the record and play medicine unit is either disposable or reusable.

14. The record and play medicine unit as described in claim 11 wherein the CPU is powered by a powering means comprising a single battery, a plurality of batteries, an array of solar cells, or an electrical wire that connects to an auxiliary electrical source.

15. The record and play medicine unit as described in claim 11 wherein the housing includes a microphone that is wired to the CPU; wherein the microphone enables a recorded audio entry to be recorded onto the CPU.

16. The record and play medicine unit as described in claim 15 wherein the microphone enables an audio file to be recorded over the pre-recorded audio entry.

17. The record and play medicine unit as described in claim 11 wherein the housing includes a computer port that enables the CPU to be connected to a computer in order to access a log of dates and times the pre-recorded audio entry was accessed by the coded key.

18. The record and play medicine unit as described in claim 11 wherein the housing includes a computer port that enables the CPU to be connected to a computer in order to access a log of dates and times the pre-recorded audio entry was accessed by multiple coded keys.

19. The record and play medicine unit as described in claim 16 wherein the housing includes a computer port that enables the CPU to be connected to a computer in order to access a log of dates and times the pre-recorded audio entry was accessed by the coded key.

20. The record and play medicine unit as described in claim 16 wherein the housing includes a computer port that enables the CPU to be connected to a computer in order to access a log of dates and times the pre-recorded audio entry was accessed by multiple coded keys.

* * * * *